(12) United States Patent
Blumenau

(10) Patent No.: US 6,460,123 B1
(45) Date of Patent: Oct. 1, 2002

(54) MIRRORING COMPUTER DATA

(75) Inventor: Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 848 days.

(21) Appl. No.: 08/757,123

(22) Filed: Dec. 3, 1996

(51) Int. Cl.[7] ............................................... G06F 12/00
(52) U.S. Cl. ...................... 711/162; 711/114; 709/203; 710/9
(58) Field of Search .................. 395/200.52, 200.33, 395/712, 829, 182.04, 500, 280; 711/162, 114, 1

(56) References Cited

U.S. PATENT DOCUMENTS

| 5,235,601 A | 8/1993 | Stallmo et al. ........ 395/182.04 |
| 5,305,438 A | 4/1994 | MacKay et al. ............ 711/122 |
| 5,337,414 A | 8/1994 | Hashemi et al. ............ 395/872 |
| 5,390,187 A | 2/1995 | Stallmo ....................... 711/114 |
| 5,398,253 A | 3/1995 | Gordon ........................ 711/114 |
| 5,435,004 A | 7/1995 | Cox et al. .................... 711/112 |
| 5,463,772 A | 10/1995 | Thompson et al. ......... 711/112 |
| 5,495,607 A | 2/1996 | Pisello et al. ............... 395/180 |
| 5,497,457 A | 3/1996 | Ford ...................... 395/182.04 |
| 5,499,337 A | 3/1996 | Gordon .................. 364/242.91 |
| 5,504,858 A | 4/1996 | Ellis et al. ............. 395/182.04 |

Primary Examiner—David Hudspeth
Assistant Examiner—Fred F. Tseng
(74) Attorney, Agent, or Firm—John M. Gunther; Penelope S. Wilson

(57) ABSTRACT

A computer including an interpreter that maps logical user write requests to physical block level write requests, a host storage driver having a disk driver interface for receiving block level write requests, a host storage disk connected to be controlled by disk control signals of the host storage driver, and a mirror system having a disk driver interface to the interpreter and a remote procedure call interface to a remote archive repository, the mirror system sending write requests and data to be written from the interpreter to the host storage driver and to the remote archive repository.

18 Claims, 7 Drawing Sheets

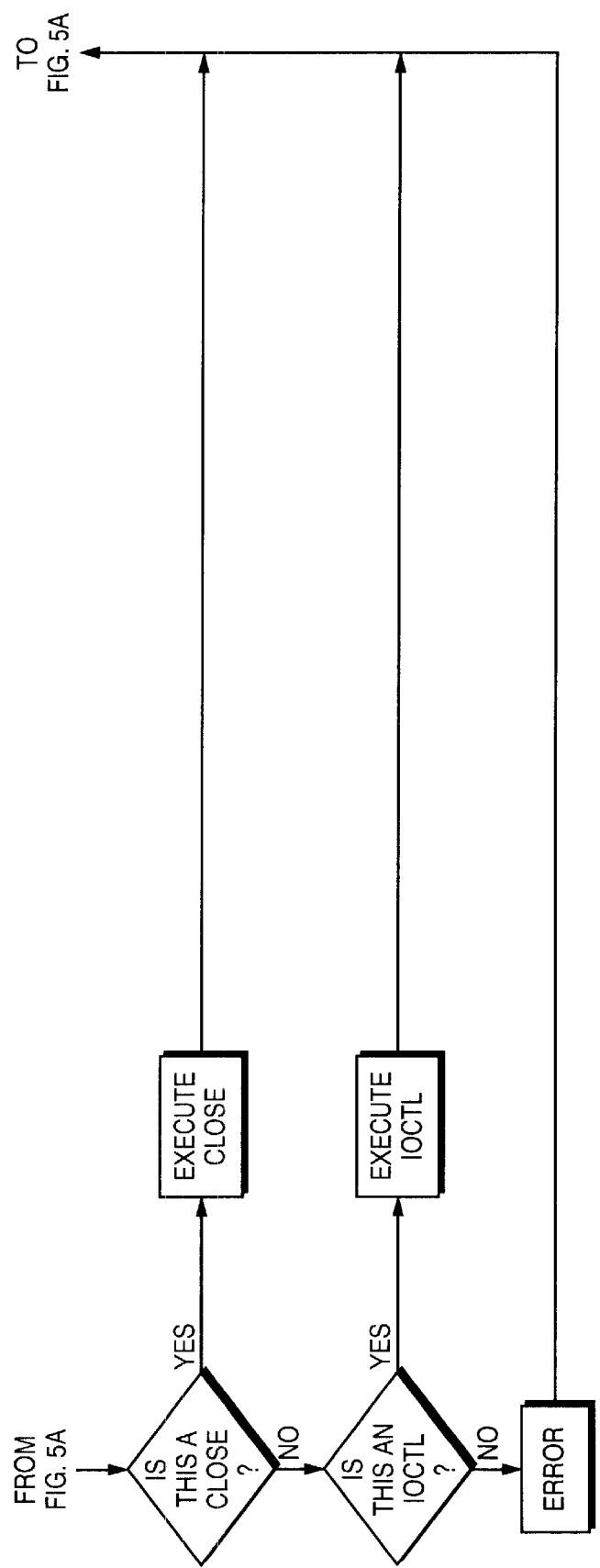

MIRRORING COMPUTER DATA

CROSS REFERENCE TO RELATED APPLICATIONS

Patent applications entitled "Restoration of Data Backed up on Archive Media", "Backing up Computer Data", Redundant Storage of Computer Data", and "Hierarchical Performance System" filed by me concurrently herewith, are incorporated herein by reference.

BACKGROUND OF THE INVENTION

The invention relates to mirroring computer data stored on a host computer storage disk.

One way to automatically provide backup of data on a computer system is by mirroring. It is known to implement mirroring on a desktop computer by having a disk driver that does all writes to two disks which thus have identical images of the stored data in the event of catastrophic failure of one disk. If one disk fails, the complete image of the data on the other disk can be accessed.

SUMMARY OF THE INVENTION

In one aspect, the invention features, in general, a computer having capabilities for backing up data to a remote archive repository. The computer includes the usual components of an interpreter (e.g., a file system or a database application that does physical to logical mapping), a host storage disk, and a host storage driver for the host storage disk. In addition the computer includes a mirror system having a disk driver interface to the interpreter and a remote procedure call interface to a remote archive repository. The mirror system sends the write requests and the data to be written from the interpreter to the host storage driver and to the remote archive repository.

In another aspect the invention features in general a computer system including a plurality of desk top computers that are connected to a network to which a remote archive repository is connected. The computers each have a mirror system as has already been described and send copies of data to be backed up to the common remote archive repository.

In another aspect the invention features in general a computer implemented method of backing up data to a remote archive repository. An interpreter on the computer maps logical user write requests to physical block level write requests. A mirror system having a disk driver interface to the interpreter and a remote procedure call interface to a remote archive repository sends the write requests and data to be written to a host storage driver for writing on a host storage disk and to the remote archive repository.

In another aspect the invention features a computer program that resides on a computer-readable medium and includes instructions causing the computer to create a mirror system as has already been described.

Certain implementations of the invention may include one or more of the following features. In certain implementations: the mirror system includes a mirror driver and an archive media system, the mirror driver providing the disk driver interface and also having an operating system device driver application programming interface to the archive media system, the archive media system being implemented in the user space of the computer and communicating with the remote archive repository; the remote archive repository includes a control program, disk storage, and a tape library.

Embodiments of the invention may have one or more of the following advantages. Mirroring is provided for a computer without the need to add hardware or backup software. The remote archive repository can be shared by a large number of computers. The approach is portable across different vendors' implementations of an operating system and different operating systems.

Other advantages and features of the invention will be apparent from the following description of a preferred embodiment thereof and from the claims.

DESCRIPTION OF THE PREFERRED EMBODIMENTS

Figure 1:
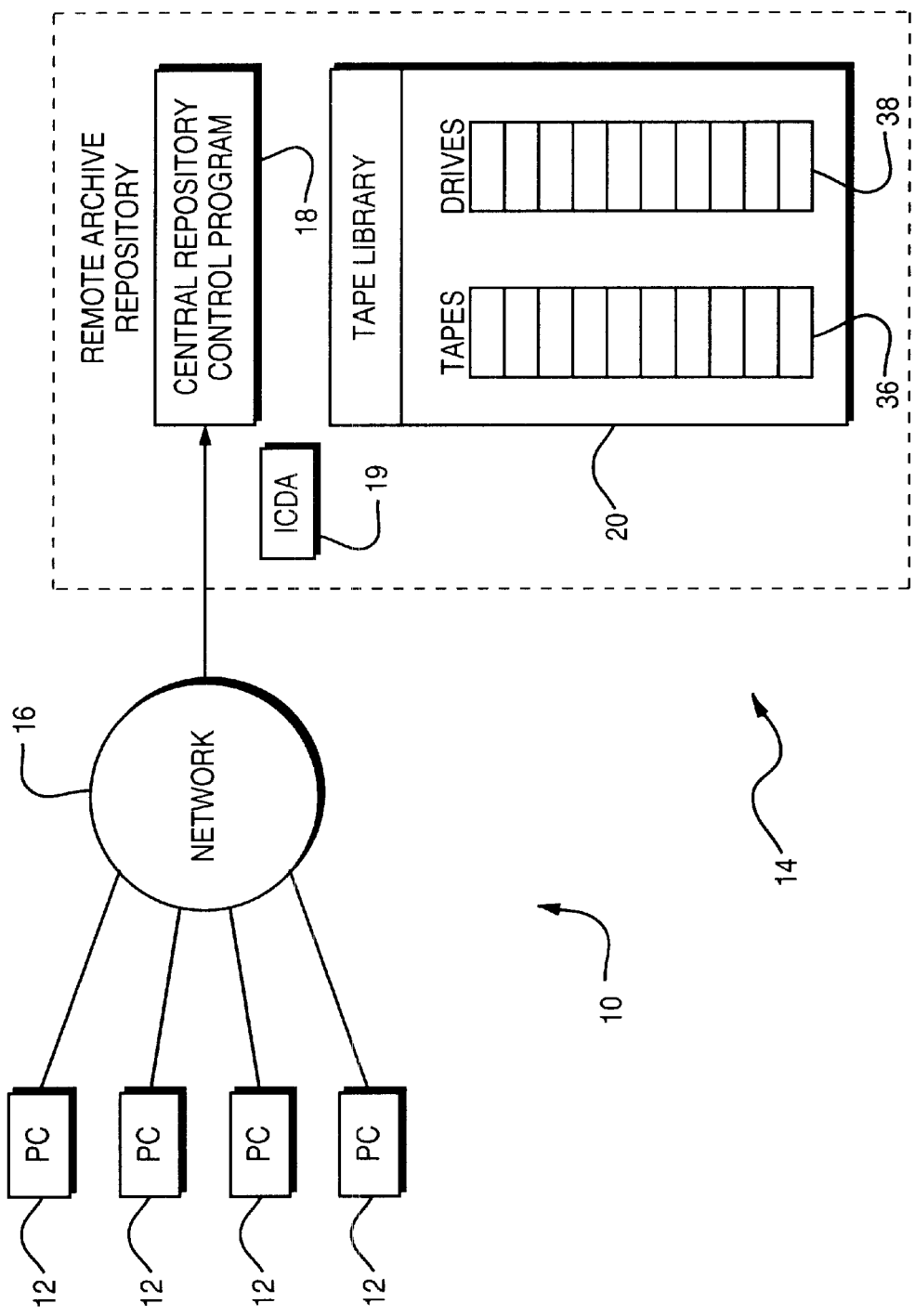
FIG. 1 is a block diagram of system for mirroring of data on a plurality of computers connected to a network.

Referring to FIG. 1, there is shown networked computer system 10. It includes a large number of desktop or other computers 12 and remote archive repository 14 all connected over network 16, which can be a local area or wide area network. Remote archive repository 14 includes repository control program 18, disk storage 19 (e.g., an ICDA) and tape library 20, though other archive media can be employed. Tape library 20 includes a plurality of tapes 36, drives 38 to access tapes 36, and a robot (not shown) to move tapes 36 into drives 38.

Figure 2:
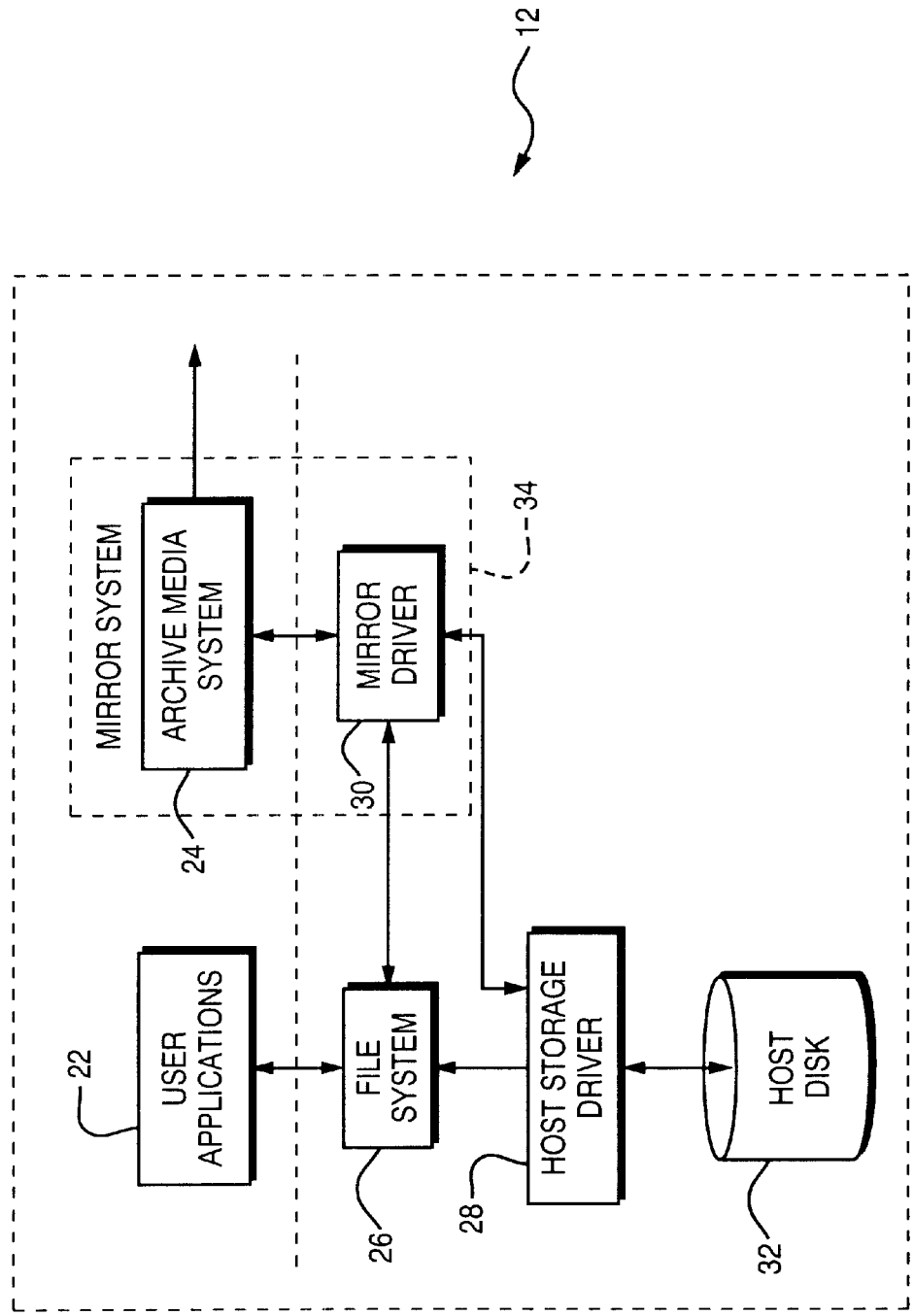
FIG. 2 is a diagram of a computer of the FIG. 1 system.

Referring to FIG. 2, computer 12 includes user applications 22 and archive media system 24 in the user application space of the computer. As also shown in FIG. 24, computer 12 includes file system 26 (e.g., the file system present in a UNIX operating system), host storage driver 28, and mirror driver 30 in the kernel space of the computer, and host disk 32. Archive media system 24 is connected to communicate with remote archive repository 14 through network 16. Mirror driver 30 and archive media system 24 together make up mirror system 34.

File system 26, host storage driver 28, and host disk 32 are common components of a computer. File system 26 and host storage driver 28 are provided in the operating system of the computer, and disk 32 is the physical medium on which the data are actually stored. A "block" of data (which might be 512 or 1K bytes or larger depending on the computer and the media type) is the smallest set of data that can be accessed on the physical media (e.g., disk 32). File system 26 carries out a logical to physical mapping; given a file name, it accesses file tables to determine where the file is physically located and converts a file name to a set of physical blocks. The file tables, which are stored along with actual data on disk 32, identify, for each file name, the starting block and the number of blocks in the file.

Figure 4:
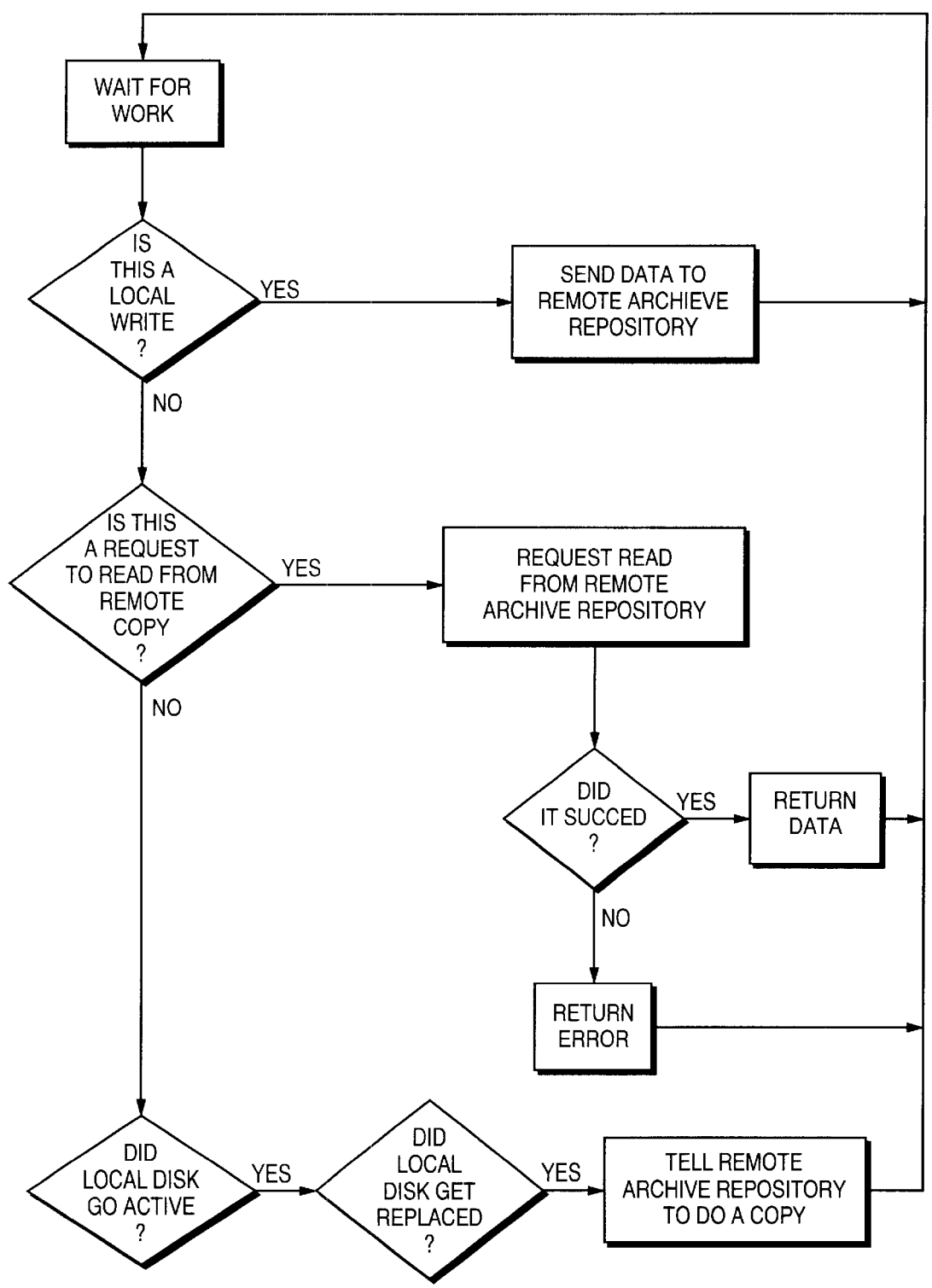
FIG. 4 is a flow chart showing the steps employed by an archive media system of the FIG. 2 computer.

Archive media system 24 processes both read (after there is a failure of disk 32) and write requests (i.e., the mirroring). FIG. 4 is a flow chart showing the steps employed by archive media system 24. Archive media system 24 uses the network identifier for its respective computer 12 to identify the mirror data being stored at remote archive repository 14. Archive media system 24 has a remote procedure call interface for transmitting data to remote archive repository 14. When blocks of data are sent from desktop computers 12 to remote archive repository 14, they are tagged with information as to which computer they came from (in the preferred implementation this is inferred from the network address) and the device name and the physical block number.

Figure 5A:
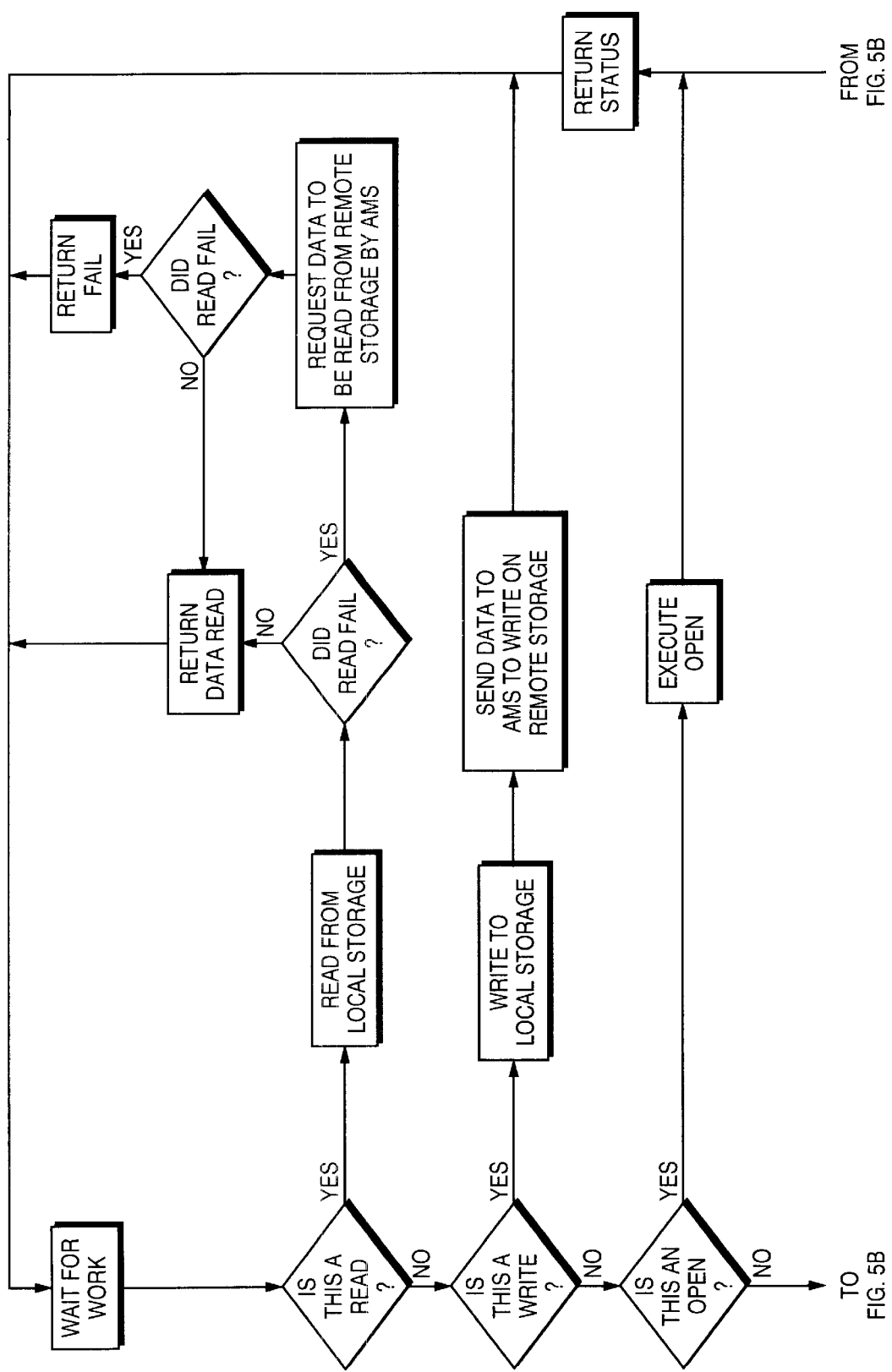
FIG. 5 is a flow chart showing the steps employed by a mirror driver of the FIG. 1 system.
Figure 6:
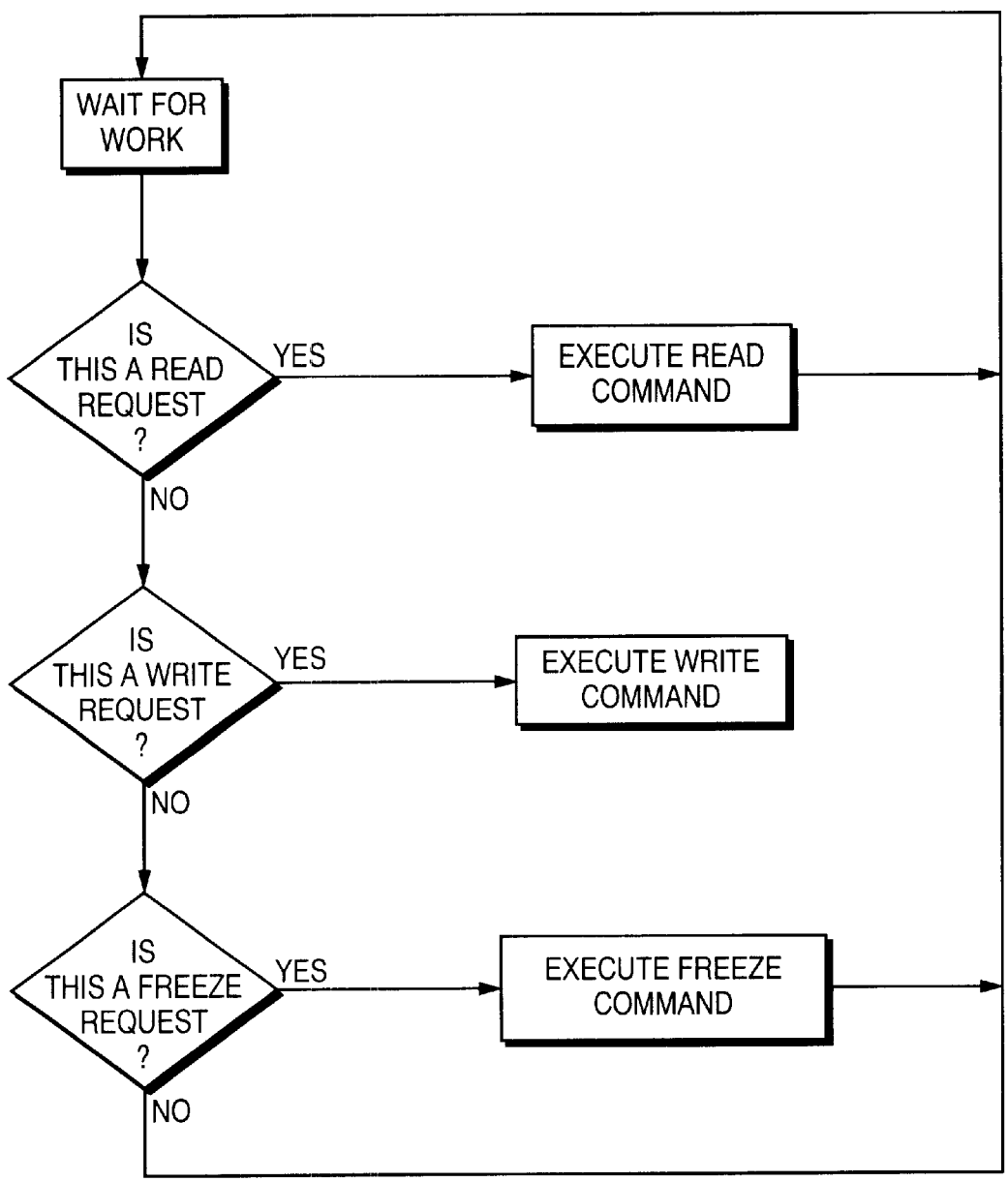
FIG. 6 is a flow chart showing the steps employed by a central repository control program of the FIG. 1 system.

Mirror driver 30 has a disk driver interface to file system 26, and looks like a disk driver to file system 26, but its function is to make a copy of all data being written to host storage driver 28 and to transfer that copy to archive media system 24 for updating a mirror image in remote archive repository 14. Mirror driver 30 has an operating system device driver application programming interface to archive media system 24. In a Unix operating system environment, archive media system 24 and mirror driver 30 can communicate via IOCTL messages, which have the following format: (operation, address of a given buffer, optional arguments). FIG. 5 is a flow chart showing the steps employed by mirror driver 30. When first started up, archive media system 24 makes an IOCTL call to mirror driver 30; there would initially not be a return of the call, because there would not be any copied data to process. When there are copied data to process, the IOCTL call is returned by mirror driver 30, and archive media system 24 looks at the return values of the IOCTL, which specify whether the operation is a read or write, the starting block number, and the number of blocks. If the operation is a write, the return includes the data being written, which are then transmitted to remote archive repository 14 (or other archive media). Archive media system 24 then sends another IOCTL call and waits for mirror driver 30 to return the IOCTL return when there are more copied data for processing.

Figure 3:
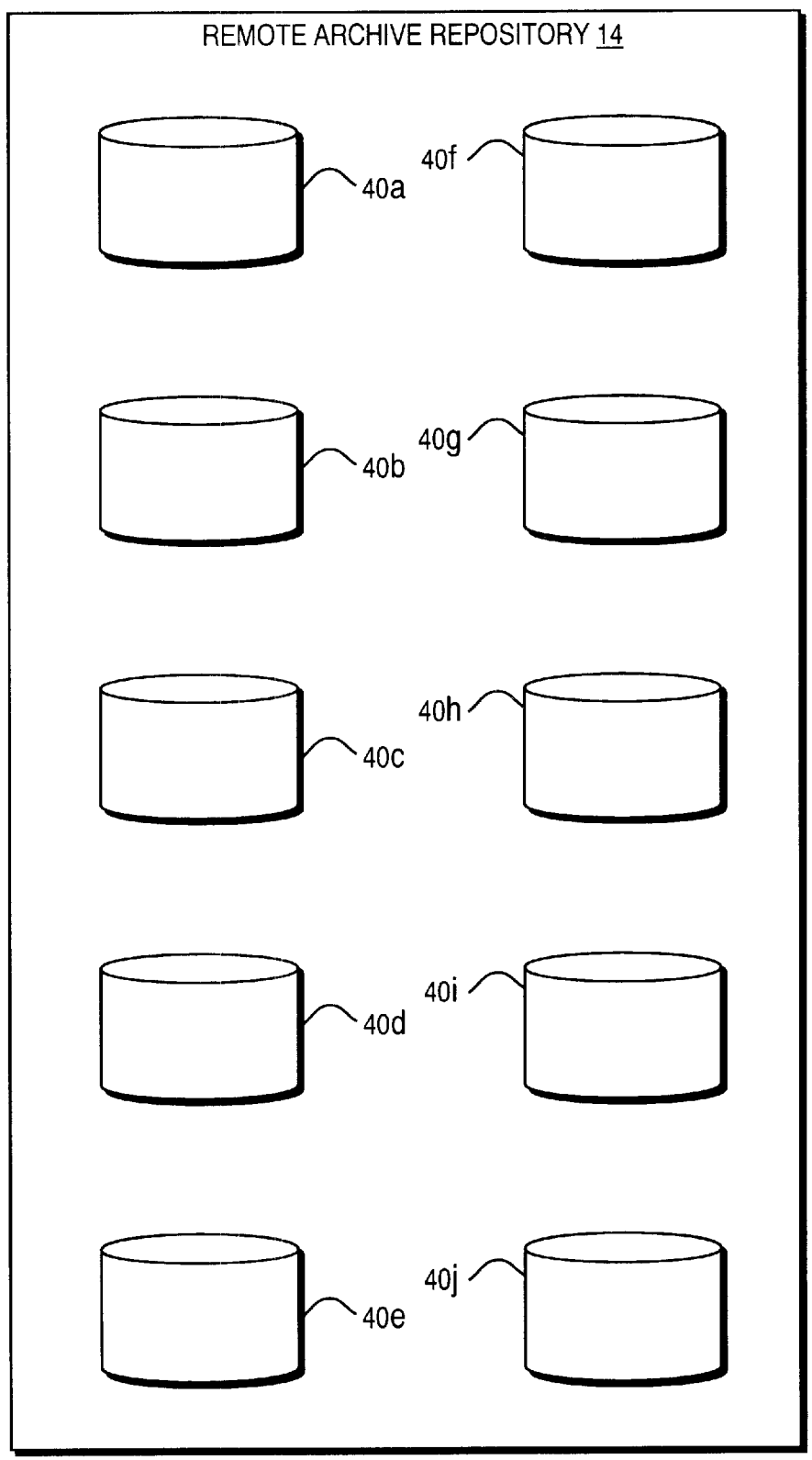
FIG. 3 is a diagram illustrating the images of stored data on a remote archive repository of the FIG. 2 computer.

Referring to FIGS. 2 and 3, on remote archive repository 14, a file corresponding to an image 40A–40J in FIG. 3 is kept on disk storage 19 for each host disk 32 of each desktop computer 12. The blocks are placed at the correct position inside the file. This file represents a real-time copy of the actual disk on the desktop computer. Alternatively, a full copy of the disk could be maintained on tape library 20, with incremental changes being kept on disk storage 19. The data backed up in the physical level mirror copies of host disks 32 include the file tables used by file system 26 to correlate file names with physical blocks. FIG. 7 is a flow chart showing the steps employed by central repository control program 18 to store backed up information and access storage disk 19, tapes 36 and drives 38.

In operation, read operations from disk 32 are handled in the normal course without copying of information. When writing, file system 26 communicates with mirror driver 30 to write the data beginning at a starting block and continuing for a number of blocks as if mirror driver 30 were a conventional host storage driver. Mirror driver 30 then passes the information on the starting block and number of blocks to host storage driver 28 and to archive media system 24. The actual data are copied by mirror driver 30 and passed to both host storage driver 28, for storage on disk 32, and to archive media system 24, for storage at remote archive repository 14.

Remote archive repository 14 treats the copied data as a regular file. Special requests can be made to the mirror driver 30 and passed on to remote archive repository 14 to freeze the current image for that personal computer 12; remote archive repository 14 would freeze the image and start a new mirrored image for subsequent changes. The user could then access the frozen image when desired for recovery or back up at any time to tape library 20.

When host disk 32 has failed and a new disk has been installed, a recovery process on desktop computer 12 can be accessed to ask for the physical blocks to be sent back. Archive media system 24 also has a user interface to identify the data set to be restored and to cause information that was stored on disk 32 to be restored from remote archive repository 14.

In system 10 a large number of computers 12 share remote archive repository 14 for mirroring, avoiding the need for additional hardware at the individual computers. The use of mirror driver 30 and AMS 24 makes the approach portable across different vendors' implementations of an operating system and also across different operating systems.

OTHER EMBODIMENTS

Other embodiments of the invention are within the scope of the appended claims. E.g., in a computer where a user application 22 is a database server application that does logical to physical mapping on a so-called raw partition that bypasses file system 26, mirror driver 30 would communicate directly with the database server application 22. In this case the database server application 22 would be considered the interpreter.

What is claimed is:

1. A computer having capabilities for backing up data to a remote archive repository, said computer comprising
 an interpreter that maps logical user write requests to physical block level write requests,
 a host storage driver having a disk driver interface for receiving block level write requests, said host storage driver generating disk control signals to write blocks of data to disk in response to block level write requests,
 a host storage disk connected to be controlled by said disk control signals of said host storage driver, and
 a mirror system having a disk driver interface to said interpreter and a remote procedure call interface to a remote archive repository, said mirror system sending write requests and data to be written from said interpreter to said host storage driver and to said remote archive repository.

2. The computer of claim 1 wherein said interpreter comprises a file system of an operating system of said computer.

3. The computer of claim 1 wherein said interpreter comprises a database server application.

4. The computer of claim 1 wherein said mirror system includes a mirror driver and an archive media system, said mirror driver providing said disk driver interface and also having an operating system device driver application programming interface to said archive media system, said archive media system being implemented in the user space of said computer and communicating with said remote archive repository.

5. A computer system comprising
 a network,
 a remote archive repository connected to said network, and
 a plurality of computers that are connected to said network and have backup capabilities for mirroring data on respective host storage disks of said computers to said remote archive repository, each said computer comprising
 an interpreter that maps logical user write requests to physical block level write requests,
 a host storage driver having a disk driver interface for receiving block level write requests, said host storage driver generating disk control signals to write blocks of data to disk in response to block level write requests, a host storage disk connected to be controlled by said disk control signals of said host storage driver, and a mirror system having a disk driver interface to said interpreter and a remote procedure call interface to said remote archive repository, said mirror system passing write requests and data to be written from said interpreter to said host storage driver and to said remote archive repository.

6. The computer system of claim 5 wherein at least one said interpreter of a said computer comprises a file system of an operating system of said computer.

7. The computer system of claim 5 wherein at least one said interpreter of a said computer comprises a database server application.

8. The computer system of claim 5 wherein at least one said mirror system of a said computer includes a mirror driver and an archive media system, said mirror driver providing said disk driver interface and also having an operating system device driver application programming interface to said archive media system, said archive media system being implemented in the user space of said computer and communicating with said remote archive repository.

9. The computer system of claim 5 wherein said remote archive repository includes a control program and disk storage.

10. The computer system of claim 9 wherein said remote archive repository includes a tape library.

11. A computer implemented method of backing up data written on a host storage disk of a computer to a remote archive repository, said method comprising mapping logical user write requests to physical block level write requests at an interpreter of said computer, receiving said physical block level write requests at a mirror system of said computer having a disk driver interface to said interpreter and a remote procedure call interface to a remote archive repository, and sending said write requests and data to be written from said mirror system to a host storage driver of said computer for writing on said host storage disk and to said remote archive repository.

12. The method of claim 11 wherein said interpreter of said computer comprises a file system of an operating system of said computer.

13. The method of claim 11 wherein said interpreter of said computer comprises a database server application.

14. The method of claim 11 wherein said mirror system of said computer includes a mirror driver and an archive media system, said mirror driver providing said disk driver interface and also having an operating system device driver application programming interface to said archive media system, said archive media system being implemented in the user space of said computer and communicating with said remote archive repository.

15. The method of claim 11 wherein said remote archive repository includes a control program and disk storage.

16. The method of claim 15 wherein said remote archive repository includes a tape library.

17. A computer program for implementation on a computer to back up data to a remote archive repository, said computer program residing on a computer-readable medium, said computer comprising an interpreter that maps logical user write requests to physical block level write requests, a host storage driver having a disk driver interface for receiving block level write requests, said host storage driver generating disk control signals to write blocks of data to disk in response to block level write requests, and a host storage disk connected to be controlled by said disk control signals of said host storage driver, said computer program comprising instructions causing said computer to create a mirror system having a disk driver interface to said interpreter and a remote procedure call interface to a remote archive repository, said mirror system sending write requests and data to be written from said interpreter to said host storage driver and to said remote archive repository.

18. The computer program of claim 17 wherein said mirror system includes a mirror driver and an archive media system, said mirror driver providing said disk driver interface and also having an operating system device driver application programming interface to said archive media system, said archive media system being implemented in the user space of said computer and communicating with said remote archive repository.

* * * * *